United States Patent
Van Der Keur et al.

(10) Patent No.: US 8,000,569 B2
(45) Date of Patent: Aug. 16, 2011

(54) OPTICAL DEVICE COMPRISING A COMPACT DISPERSING SYSTEM

(75) Inventors: Michiel Jacobus Van Der Keur, Kermaria-Sulard (FR); Alain Poudoulec, Lannion (FR)

(73) Assignee: Yenista Optics, Lannion (FR)

( * ) Notice: Subject to any disclaimer, the term of this patent is extended or adjusted under 35 U.S.C. 154(b) by 0 days.

(21) Appl. No.: 12/356,775

(22) Filed: Jan. 21, 2009

(65) Prior Publication Data

US 2009/0220195 A1 Sep. 3, 2009

(30) Foreign Application Priority Data

Jan. 23, 2008 (EP) .................................... 08001175

(51) Int. Cl.
*G02B 6/28* (2006.01)
(52) U.S. Cl. ................. 385/24; 385/31; 385/37; 385/39
(58) Field of Classification Search ...................... 385/24
See application file for complete search history.

(56) References Cited

U.S. PATENT DOCUMENTS 6,597,452 B1    7/2003   Jiang et al.

FOREIGN PATENT DOCUMENTS

| EP | 0 067 972 A | 12/1982 |
| FR | 2 779 535 A | 12/1999 |
| JP | 2004 029298 A | 1/2004 |

*Primary Examiner* — Sarah Hahm
(74) *Attorney, Agent, or Firm* — Gerald E. Helget; Nelson R. Capes; Briggs and Morgan, P.A.

(57) ABSTRACT

A fibre optic transmission application, in particular, an optical device that can be incorporated into telecommunications equipment as well as into test and measurement equipment with reduced insertion loss, reduced crosstalk effects and reduced height, with increased versatility in the implementation of optical functions other than multiplexers and demultiplexers. Relates to components, modules, equipments and instruments such as multiplexers, demultiplexers, routers, channel monitors, and tunable filters that encompass such optical devices.

33 Claims, 9 Drawing Sheets

PRIOR ART

PRIOR ART

PRIOR ART

PRIOR ART

OPTICAL DEVICE COMPRISING A COMPACT DISPERSING SYSTEM

CROSS REFERENCE TO RELATED APPLICATION

The present application is based on and claims priority to European Patent Application No. 081001175.2 filed on Jan. 23, 2008, the content of which is hereby incorporated by reference in its entirety.

BACKGROUND OF THE INVENTION

The optical devices are based on a dispersing system with a diffraction grating that is operated near Littrow. In such a system, the following relation is approximately valid $$Gm\lambda = 2\sin(\beta) \qquad (1)$$

where G is the groove density of the grating, m is the order of diffraction (an integer), λ is the wavelength and β the Littrow angle.

The dispersing system has to be compact in order to keep the size of the optical devices compatible with the requirements for telecommunications equipment as well as for test and measurement equipment.

Wavelength multiplexers, demultiplexers and routers based on a compact dispersing system are available. These devices have been described and progressively developed, in particular in French patents FR-2.479.981, FR-2.496.260, FR-2.519.148, FR-2.543.768, FR-2.579.333, FR-2.731.573, FR-2.743.424, FR-2.761.485, FR-2.763.139, FR-2.764.393, FR-2.765.424, FR-2.765.972, FR-2.779.535, FR-2.803.046 and FR-2.832.882. A first generation of multiplexers-demultiplexers has been marketed under the brand <<STIMAX>>, and subsequently, a second generation has followed under the brand <<MINILAT>>. For a short description of the state of the art, we refer to chapter 3 of the book: Wavelength Filters in Fibre Optics, Herbert Venghaus (Ed.), Springer Verlag, Berlin, 2006.

Wavelength multiplexers and demultiplexers are elementary devices in today's fibre optic long-haul and metro networks. The optical layer of these networks is evolving from static to more dynamic in order to reduce the number of O-E-O (Optical-Electrical-Optical) conversions as well as to remotely optimize transmission capacity for continuously changing traffic demands. This implies that devices are required for monitoring and routing of channels such as, for example, tunable lasers, tunable filters and optical channel monitors. It is noted that these devices also correspond to components and modules incorporated in test and measurement equipment.

Figure 1A:
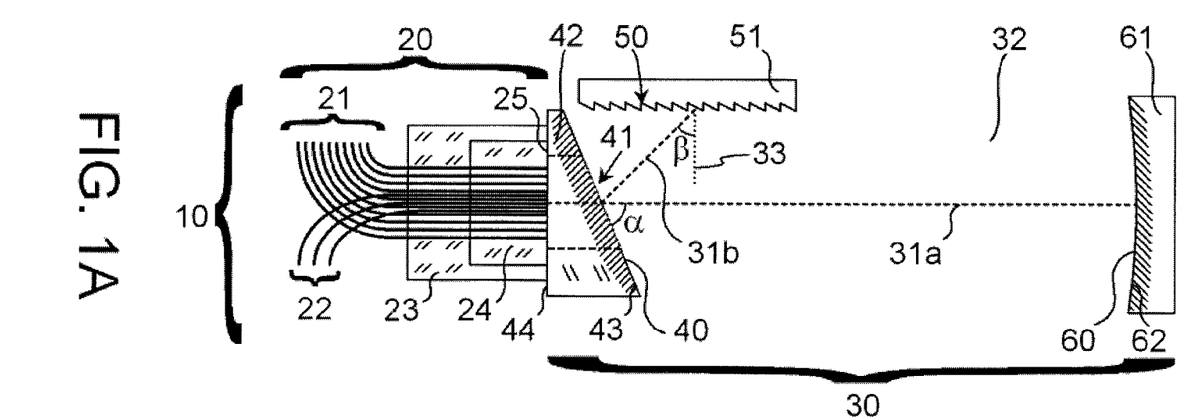
FIG. 1A and FIG. 1B represent an optical device of the prior art showing the optical axes of the dispersing system.
Figure 1B:
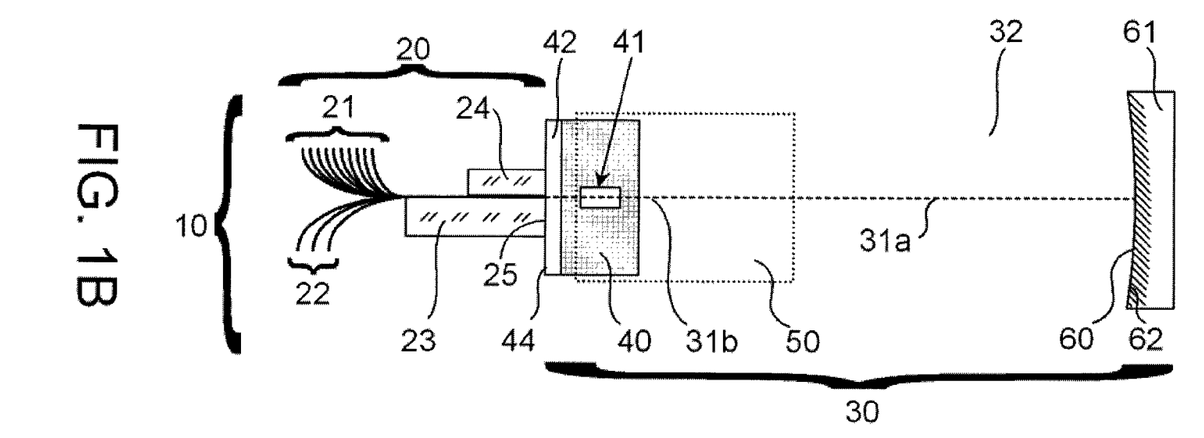

FIG. 1A and FIG. 1B represent an optical device 10 of the prior art according to the French patent application FR-2.779.535. The optical device is composed of a fibre array 20 comprising an end face 25 and a compact dispersing system 30. FIG. 1A is a top view of the optical device 10 and FIG. 1B is a side view of the same optical device 10. The optical device 10 can be for example a wavelength multiplexer, demultiplexer, or router. When the optical device 10 is a multiplexer, it comprises N input fibres 21 and a single output fibre 22. When the optical device is a demultiplexer, it comprises a single input fibre 22 and N output fibres 21. When the optical device is a router, it comprises N input fibres 21 and M output fibres 22 or vice versa.

The optical device 10 of FIG. 1A and of FIG. 1B will be described as a demultiplexer. A multiplexer and a demultiplexer are in principle the same device: a demultiplexer is a multiplexer operated in reverse direction. Hereafter, all multiplexers-demultiplexers will be described as demultiplexers. Operation of a multiplexer is obtained from a demultiplexer by reversing beam propagation in the device which implies that input fibre(s) become output fibre(s) and vice versa. It is noted that the optical device 10 is called an optical filter when it has a single input fibre 21 in combination with a single output fibre 22.

The compact dispersing system 30 is composed of a plane mirror 40 with a small aperture 41 in the centre, a concave spherical mirror 60 having a focus and a plane diffraction grating 50 having a dispersion plane. The system 30 ensures wavelength selective conjugation between the end faces of the input fibres 22 and the end faces of the output fibres 21 of the fibre array 20. The optical axis of the system, comprising two parts referenced 31a and 31b, is folded for compactness of the device. The first part of the optical axis 31a runs from the end face 25 of the fibre array 20 through the aperture 41 in the plane mirror 40 up to the centre of the spherical mirror 60, it is perpendicular to the end face 25 of the fibre array 20 as well as to the spherical mirror 60, and it makes an angle α with respect to the plane mirror 40 (FIG. 1A). The diffraction grating 50 makes an angle α with respect to the plane mirror 40 and its dispersion plane coincides with the horizontal plane of the optical device 10. The second part of the optical axis 31b runs from the aperture 41 in the plane mirror 40 to the diffraction grating 50, it makes an angle β with the normal 33 of the grating 50 where β is the Littrow angle and it intersects the first part of the optical axis 31a in the plane of the plane mirror 40, such that the angles α and β are related as follows: α=(β+90°)/2.

FIGS. 1A and 1B show an embodiment of the compact dispersing system 30 using three parts: a wedge prism 42, a plano-concave lens 61, and a substrate 51. The wedge prism 42 with a small aperture in the centre is used to ensure the positioning of the plane mirror 40 with respect to the optical axis 31a, 31b. The tilted face 43 of the wedge prism 42 serves as support for the plane mirror 40 whereas the opposite face 44 of the wedge prism 42 is parallel to the end face 25 of the fibre array 20. The plano-concave lens 61 serves as support for the spherical mirror 60 that resides on its concave face 62. The substrate 51 serves as support for the plane diffraction grating 50 which is formed on the surface of the substrate. The space 32 is filled with air, vacuum or a gas.

The fibre array 20 enables accurate positioning of the end faces of the input fibres 22 and output fibres 21 with respect to the compact dispersing system 30. The fibre end faces are located in the same plane as the end face 25 of the fibre array 20 which is perpendicular to the first part of the optical axis 31a of the dispersing system 30. The fibre end faces are positioned with respect to the aperture 41 in the plane mirror 40 such that outgoing and incoming beams are not affected by the presence of the plane mirror 40.

The fibres 21, 22 are supported by the fibre array 20 which comprises a V-groove block 23 also called V-groove substrate and a V-groove lid 24, between which the fibres 21, 22 are mounted.

Figure 2A:
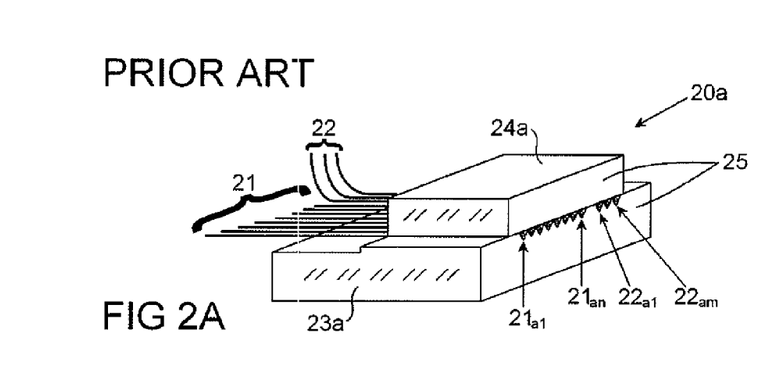
FIG. 2A and FIG. 2B represent a first embodiment of a fibre array for optical devices of the prior art.
Figure 2B:
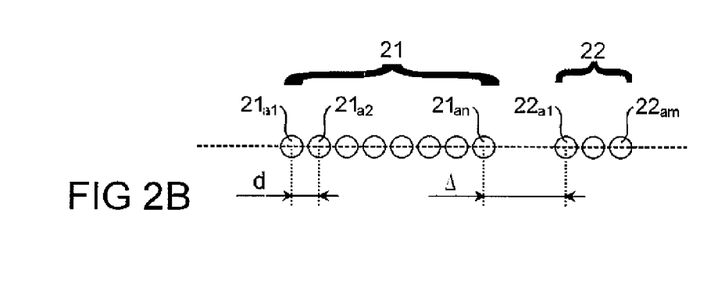

FIG. 2A shows a first embodiment of a fibre array 20a for optical devices of the prior art. FIG. 2B shows the end faces of the fibres 21, 22 of the fibre array 20a depicted in FIG. 2A.

The fibre array 20a comprises a V-groove block 23a in which the fibres 21, 22 are placed and a lid 24a covering the fibres 21, 22. The end faces of the M input fibres are referenced by $22_{a1}, \ldots, 22_{am}$, and the end faces of the N output fibres are referenced by $21_{a1}, \ldots, 21_{an}$.

The fibre array 20a comprises an end face 25 which is polished such that the end faces of the fibres 21, 22 become part of the end face 25 of the fibre array 20a. In case there is a refractive index difference between the fibres 21, 22 and the adjacent medium, generally, an anti-reflection coating is applied on the end face 25 to eliminate the Fresnel reflection.

The end faces of the fibres 21, 22 are positioned on a straight line as shown in FIG. 2B. In the optical device 10, the straight line is positioned parallel to the dispersion plane of the grating 50. In case of demultiplexing of channels that are equidistantly spaced with respect to wavelength, the end faces of the output fibres $21_{a1}, \ldots, 21_{an}$ are equidistantly spaced at a distance d. The end face of the input fibre $22_{a1}$ is separated from the last end face of the output fibre $21_{an}$ by a minimum distance $\Delta$, typically between 2d and 5d to keep the size of the aperture 41 in the plane mirror 40 limited while minimizing crosstalk effects.

Figure 3A:
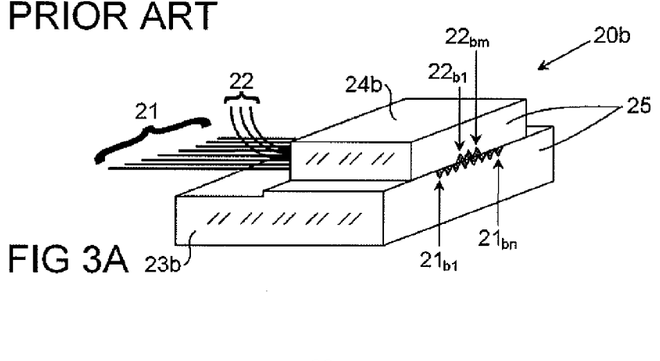
FIG. 3A and FIG. 3B represent a second embodiment of a fibre array for optical devices of the prior art.
Figure 3B:
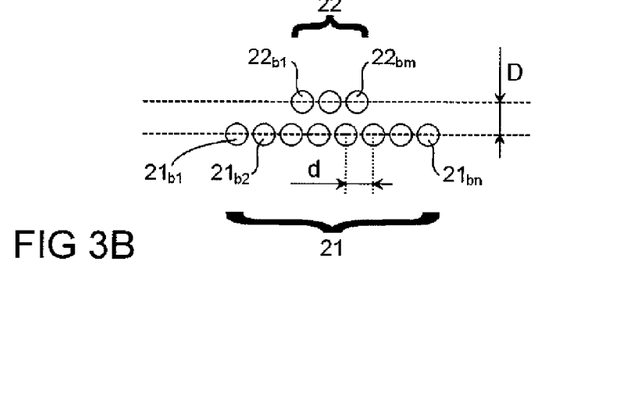

FIG. 3A shows a second, more complex, embodiment of a fibre array 20b for optical devices of the prior art that enables further minimization of crosstalk effects, in particular return loss and directivity which is described in the French patent FR-2.731.573. FIG. 3B shows the end faces of the fibres 21, 22 of the fibre array 20b depicted in FIG. 3A.

The fibre array 20b comprises a first V-groove block 23b and a second V-groove block 24b. The first V-groove block 23b is the substrate in which the output fibres 21 are placed and it serves as the lid for covering the input fibres 22. The second V-groove block 24b is the substrate in which the input fibres 22 are placed and it serves as the lid for covering the output fibres 21. The end faces of the M input fibres are referenced by $22_{b1}, \ldots, 22_{b}$, and the end faces of the N output fibres are referenced by $21_{b1}, \ldots, 21_{bn}$. It is noted that stacking of two V-groove blocks 23b and 24b requires accurate alignment to ensure parallelism between output fibres 21 of block 23b and input fibres 22 of block 24b.

Like in the fibre array 20a, the fibre array 20b comprises an end face 25 which is polished such that the end faces of the fibres 21, 22 become part of the end face 25 of the fibre array 20b. In case there is a refractive index difference between the fibres 21, 22 and the adjacent medium, generally, an anti-reflection coating is applied on the end face 25 to eliminate the Fresnel reflection.

The end faces of the fibres 21, 22 are positioned on two parallel straight lines: the end faces of the input fibres $22_{b1}, \ldots, 22_{bm}$ on one line and the end faces of the output fibres $21_{b1}, \ldots, 21_{bn}$ on the other line as shown in FIG. 3B. In the optical device 10, the straight lines are positioned parallel to the dispersion plane of the grating 50. In case of demultiplexing of channels that are equidistantly spaced with respect to wavelength, the end faces of the output fibres $21_{b1}, \ldots, 21_{bn}$ are equidistantly spaced at a distance d. The end face of the input fibre $22_{b1}$ is separated from the straight line of the end faces of the output fibres $21_{b1}, \ldots, 21_{bn}$ by a minimum distance D, typically between d and 2d to keep the size of the aperture in the plane mirror 41 limited while minimizing crosstalk effects.

Figure 4A:
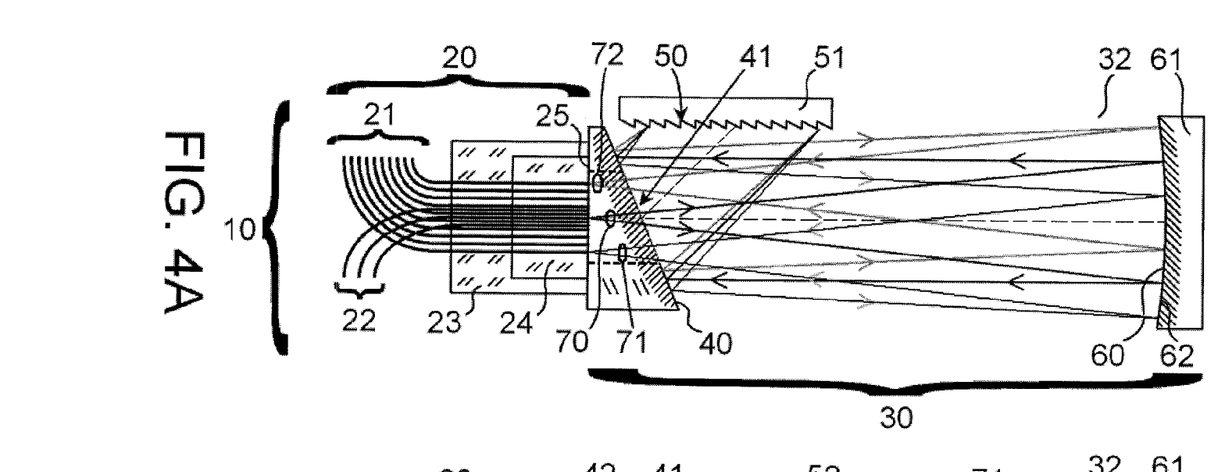
FIG. 4A and FIG. 4B represent the optical device of the prior art showing beam propagation in the dispersing system.
Figure 4B:
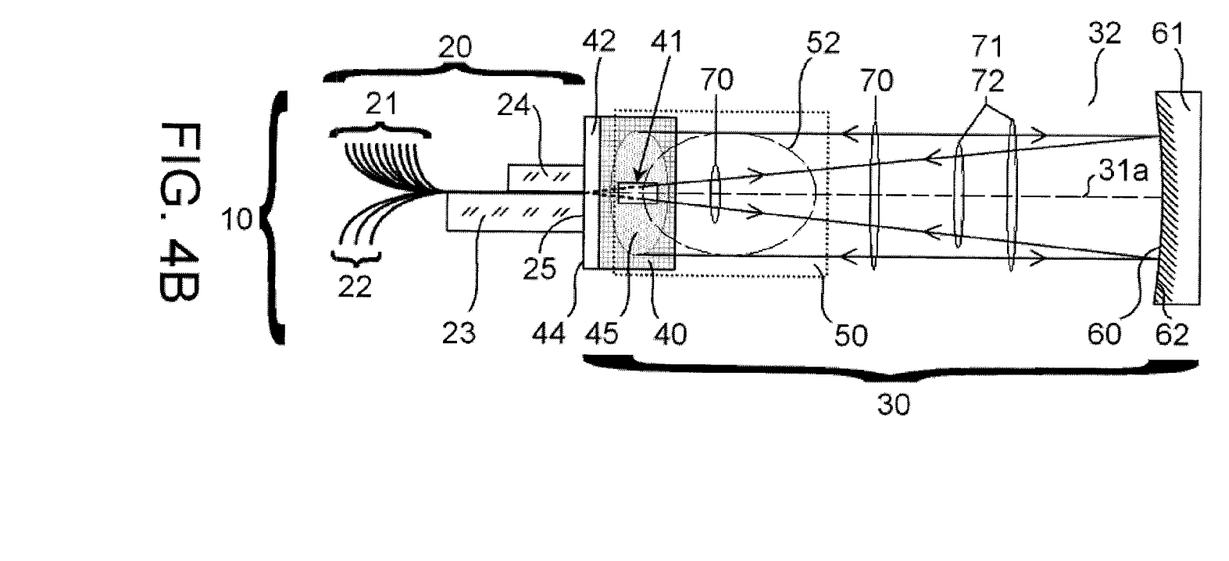

FIG. 4A and FIG. 4B show beam propagation in the optical device 10, where FIG. 4A is a top view of the device 10 and FIG. 4B is a side view of the same device 10.

In case the optical device 10 operates as a demultiplexer, a signal containing a spectral multiplex of channels enters through the input fibre 22, propagates up to its end face $22_{a1}$, $22_{b1}$ and continues its path by beam propagation in the homogeneous medium 32, where the beam 70 propagates about parallel to the optical axis 31a. The beam 70 passes through the aperture 41 in the plane mirror 40 and diverges until it impinges on the concave spherical mirror 60.

Figure 5:
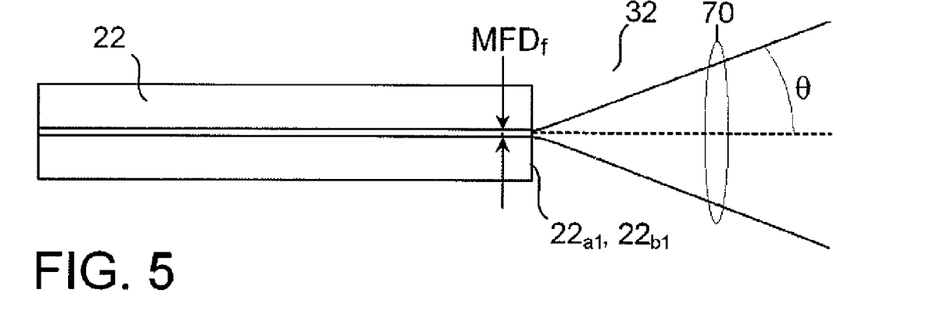
FIG. 5 shows propagation in a single mode optical fibre up to its end face followed by beam propagation in the adjacent homogeneous medium.

FIG. 5 represents propagation in the single mode optical the fibre 22 up to its end face $22_{a1}$, $22_{b1}$ followed by beam propagation in the adjacent homogeneous medium 32. Propagation inside the fibre 22 corresponds to a guided mode, having a constant Mode Field Diameter (relative field intensity level of $1/e^2$), abbreviated as MFD. For example, in the commonly used fibre SMF-28 from Corning, the MFD is around 10.4 μm at a wavelength $\lambda_0$ of 1550 nm. Beam propagation in the adjacent homogeneous medium 32 starts from the fibre end face $22_{a1}$, $22_{b1}$ where the beam has its waist equal to the WD. In the adjacent medium 32, the beam 70 diverges according to a cone with an angle θ for the relative field intensity level of $1/e^2$. The beam waist (MFD) and θ are related as follows:

$$\theta = \arctan((2\lambda/(\pi MFD)). \quad (2)$$

For the SMF-28 fibre, a wavelength $\lambda = \lambda_0/n$ with $\lambda_0$ (wavelength in vacuum) of 1550 nm, and an adjacent medium 32 with a refractive index n of 1, the angle θ is 5.4°. The cone intersects with the spherical mirror 60 at a propagation distance about equal to the focal length f of the mirror 60. The reflection area of the beam 70 on the mirror 60 has a diameter t of approximately:

$$t \approx 2f \tan(\theta) = 4f\lambda/(\pi MFD). \quad (3)$$

For a focal length f of 65 mm in combination with the parameters of the preceding example, the diameter t is about 12.3 mm.

The reflection of the beam 70 on the concave spherical mirror 60 collimates it and reverses its direction of propagation about parallel to the optical axis 31a. Subsequently, it impinges on the plane mirror 40 that reflects it towards the grating 50. A portion of the beam 70 is not reflected due to the small aperture 41 in the plane mirror 40; therefore, increasing the insertion loss and crosstalk effects of the device 10. The beam 70 incident on the grating 50 near Littrow is diffracted back towards the plane mirror 40. The diffraction angularly separates the beam 70, containing a spectral multiplex of channels, into beams as a function of wavelength and therefore separating the channels. Only the beams 71 and 72 corresponding to the first and the last channels are shown in FIG. 4A and FIG. 4B. Subsequently, they impinge on the plane mirror 40 that reflects them towards the concave spherical mirror 60. Again a portion of each beam 71, 72 is not reflected due to the small aperture 41 in the plane mirror 40; therefore, further increasing the insertion loss of the device 10. The reflection of each beam 71, 72 on the concave spherical mirror 60 reverses the direction of propagation and focuses each beam 71, 72 about parallel to the optical axis 31a through the small aperture 41 in the plane mirror 40 onto the end faces of their corresponding output fibres $21_{a1}, \ldots, 21_{an}, 21_{b1}, \ldots, 21_{bn}$. At these end faces, the size of the beams is about equal to the MFD of the guided mode of the output fibres 21 and propagation continues inside these single mode fibres by their guided mode. This implies that the signal present at the input fibre 22 is demultiplexed at the output fibres 21: each output fibre contains one of the channels of the spectral multiplex, the signal that entered through the input fibre.

FIG. 4B shows the reflection area 45 of all impinging beams 70, 71 and 72 on the plane mirror 40 and FIG. 4B also shows the diffraction area 52 of the impinging beam 70 on the grating 50. These areas, depending on the MFD of the input fibre 22 and the focal length of the dispersing system 30, give an indication of the required size of the different parts. It is noted that the size of the optical device 10 increases when the spectral spacing between the channels decreases because an increase of the focal length of the dispersion system 30 is required. In telecommunications equipment, the height of the optical devices is limited by the distance between the printed circuit boards on which these devices are mounted; for multiplexers and demultiplexers, height of a packaged optical device is typically 14 mm and maximum 16 mm whereas more complex wavelength routing devices can have a height up to 50 mm.

In the French patent application FR-2.779.535, it is indicated that laser diode arrays and photodiode arrays can be used in the optical devices 10, because they have dimensions comparable to those of optical fibres. For example, an optical channel monitor is obtained by replacing the output fibres 21 of a demultiplexer with an array of photodiodes. The implementation is not obvious: a fibre array, similar to FIG. 2 or FIG. 3, needs to be assembled in which the distance Δ or D between end face of the input fibre $22_{a1}$, $22_{b1}$ and the photodiodes must be kept small. It is feasible when the input fibre $22_{a1}$, $22_{b1}$ is incorporated into the mount of the photodiode array, but this is more difficult to manufacture.

The optical devices of the prior art described above have a number of drawbacks concerning their insertion loss, their crosstalk effects, their height and their versatility.

The presence of the small aperture 41 in the plane mirror 40 causes an increase in the insertion loss of the optical device 10, because twice a portion of the beam incident on the mirror 40 enters into the aperture 41 instead of being reflected. Moreover, the portion of the beam coming from the spherical mirror 60 enters the aperture 41 about parallel to the optical axis 31a. Therefore, a small part of it couples into the input fibres 22 and output fibres 21 adding to the crosstalk effects.

The aperture 41 in the plane mirror 40 must be kept small to limit the increase of the insertion loss which implies that the distance Δ or D between end faces of the input fibres $22_{a1}, \ldots, 22_{am}, 22_{b1}, \ldots, 22_{bm}$, and the output fibres $21_{a1}, \ldots, 21_{an}, \ldots, 21_{b1}, \ldots, 21_{bn}$ must also be kept small, FIG. 2B and FIG. 3B. Although, fibre array 20b enables further minimization of crosstalk effects compared to fibre array 20a, some crosstalk effects remain due to the fact that the end faces of the input fibres $22_{a1}, \ldots, 22_{am}, 22_{b1}, \ldots, 22_{bm}$, and the output fibres $21_{a1}, \ldots, 21_{an}, 21_{b1}, \ldots, 21_{bn}$ are very close.

For optical devices 10 with a relatively great focal length, the beam diameter at the spherical mirror becomes bigger than the acceptable height for optical devices used in telecommunications equipments. In particular, multiplexers and demultiplexers have a tight limit with respect to height.

As aforementioned, devices are required for monitoring and routing of channels such as, for example, tunable lasers, tunable filters and optical channel monitors. The optical devices 10 can be used for the implementation of these devices, but they are not very well suited from a manufacturing point of view since standard mounts for laser diode arrays and photodiode arrays cannot be directly used. For that reason, the optical devices 10 are not very versatile.

SUMMARY OF THE INVENTION

The principal purpose of the present invention is to propose optical devices that are at least as compact as the optical devices of the prior art, that enable the implementation of the same functions but with reduced insertion loss, reduced crosstalk effects and reduced height, and that are more versatile with respect to the implementation of optical functions other than multiplexers and demultiplexers.

To that end, the present invention concerns an optical device comprising:
  a fibre array comprising an end face and
  a compact dispersing system,
the fibre array being a mounting assembly that comprises M input elements which beam emitting end faces are positioned on a first straight line said emission line, and N output elements which beam receiving end faces are positioned on a second straight line said reception line which is parallel to the first line and separated from the first line by a distance D chosen such that at least the input elements do not affect the output elements and vice versa, where the end faces of the input elements and the output elements are positioned such that they substantially coincide with the end face of the fibre array,
  the compact dispersing system ensuring wavelength selective conjugation of signals between the end faces of the input elements and the end faces of the output elements based on beam propagation and comprising:
    a plane mirror,
    a concave mirror having a focus, a focal plane and an axis that intersects the end face of the fibre array half way between the two said parallel straight lines while being perpendicular to the end face of the fibre array, and
    a plane diffraction grating having a dispersion plane that is parallel with respect to the two said parallel straight lines while the diffraction grating makes an angle of '90°−φ' with respect to the end face of the fibre array where the angle φ is chosen such that the position of the grating does not affect beam propagation in the compact dispersing system,
  the end face of the fibre array being located in the vicinity of the focal plane of the concave mirror such that the diverging beams coming from the end faces of the input elements become collimated by reflection on the mirror while being directed towards the plane mirror,
  the plane mirror reflecting the collimated beams coming from the concave mirror to the grating and, inversely, reflecting the diffracted collimated beams coming from the grating to the concave mirror, being firstly located between the end face of the fibre array and the concave mirror, being secondly perpendicular to the dispersion plane, and making thirdly an angle 'α' with respect to the axis of the concave mirror such that the diffraction grating is located in the vicinity of the focus of the concave mirror, the angle α being chosen such that the diffraction grating is operated near Littrow,
  the concave mirror reflecting the dispersed collimated beams coming from the plane mirror such that the beams are focused on the reception line of the fibre array, about linearly distributed over the line with respect to wavelength, and entering the end faces of the output elements where they are present,
  the optical device being characterised in that the size of the plane mirror is limited with respect to the two said parallel straight lines such that beams propagating from the end faces of the input elements to the concave mirror and beams propagating from the concave mirror to the end faces of the output elements are not affected by the presence of the plane mirror.

Advantageously, the plane mirror has a rotation mechanism for tuning the angle α which enables wavelength tuning of the device.

Advantageously, the diffraction grating has a rotation mechanism for tuning the angle φ which enables wavelength tuning of the device.

Advantageously, the fibre array has a translation mechanism for simultaneously tuning the position of the end faces of the input elements and the output elements over the said parallel straight lines which enables wavelength tuning of the device.

Advantageously, the concave mirror has a translation mechanism for tuning the position of the concave mirror parallel along the said parallel straight lines which enables wavelength tuning of the device.

Advantageously, each input element is a single mode fibre.

Advantageously, each single mode fibre is terminated with collimating means.

Advantageously, each output element is a single mode fibre.

Advantageously, each single mode fibre is terminated with collimating means.

Advantageously, each input element is a multimode fibre terminated with collimating means.

Advantageously, each output element is a multimode fibre terminated with collimating means.

Advantageously, each output element is a photodiode.

Advantageously, each photodiode is terminated with collimating means.

Advantageously, each input element is a laser diode terminated with collimating means.

Advantageously, each collimating means consists of a microlens

Advantageously, each collimating means consists of a graded-index lens spliced to the end of said single mode fibre.

The present invention concerns also a single mode wavelength router characterised in that it comprises an optical device according to previous embodiments.

The present invention concerns also a single mode wavelength multiplexer characterised in that it comprises an optical device according to previous embodiments, and in that there is only one output fibre.

The present invention concerns also a single mode wavelength demultiplexer characterised in that it comprises an optical device according to previous embodiments, and in that there is only one input fibre.

The present invention concerns also a single mode wavelength filter characterised in that it comprises an optical device according to previous embodiments, and in that there is only one input fibre and one output fibre.

The present invention concerns also a single mode optical channel monitor characterised in that it comprises an optical device according to previous embodiments, and in that there is only one input fibre.

The present invention concerns also a single mode router/multiplexer/demultiplexer/filter/channel monitor according to any of previous embodiments, characterised in that, when the optical device comprises single mode fibres terminated with collimating means, each said collimating mean consists of a graded-index lens spliced to the end of said single mode fibre.

The present invention concerns also a single mode router/multiplexer/demultiplexer/filter/channel monitor according to any of previous embodiments, characterised in that, when the optical device comprises collimating means, each said collimating means consists of a microlens.

The present invention concerns also a multimode wavelength router characterised in that it comprises an optical device according to previous embodiments.

The present invention concerns also a multimode wavelength multiplexer characterised in that it comprises an optical device according to previous embodiments, and in that there is only one output fibre.

The present invention concerns also a multimode wavelength demultiplexer characterised in that it comprises an optical device according to previous embodiments, and in that there is only one input fibre.

The present invention concerns also a multimode wavelength filter characterised in that it comprises an optical device according to previous embodiments, and in that there is only one input fibre and one output fibre.

The present invention concerns also a multimode optical channel monitor characterised in that it comprises an optical device according to previous embodiments, and in that there is only one input fibre.

The present invention concerns also a multimode router/multiplexer/demultiplexer/filter/channel monitor according to any of previous embodiments, characterised in that the optical device comprises collimating means where each said collimating mean consists of a microlens.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION OF THE PREFERRED EMBODIMENTS

Figure 6A:
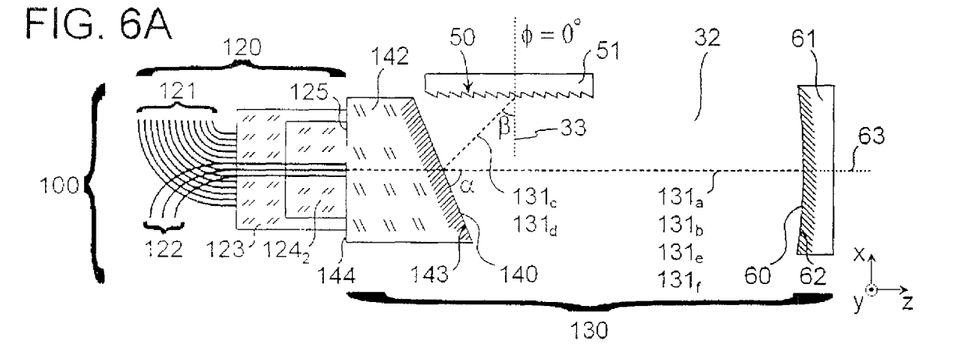
FIG. 6A and FIG. 6B represent an optical device according to the invention, showing the optical axis of the dispersing system.
Figure 6B:
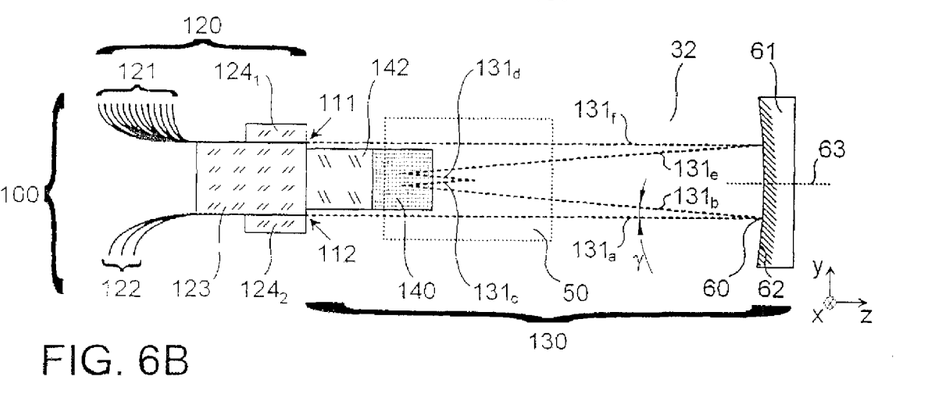

FIG. 6A and FIG. 6B represent an optical device 100 according to the present invention which can be for example a wavelength router, multiplexer, demultiplexer, or filter. The optical device is composed of a fibre array 120 comprising an end face 125 and a compact dispersing system 130. FIG. 6A is a top view of the optical device 100 and FIG. 6B is a side view of the same optical device 100.

Figure 7A:
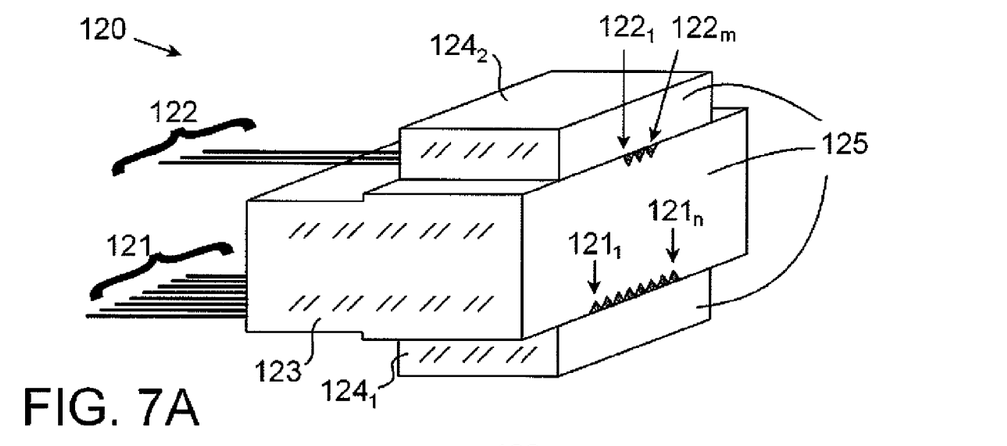
FIG. 7A and FIG. 7B represent a first embodiment of the fibre array used in an optical device according to the invention.
Figure 7B:
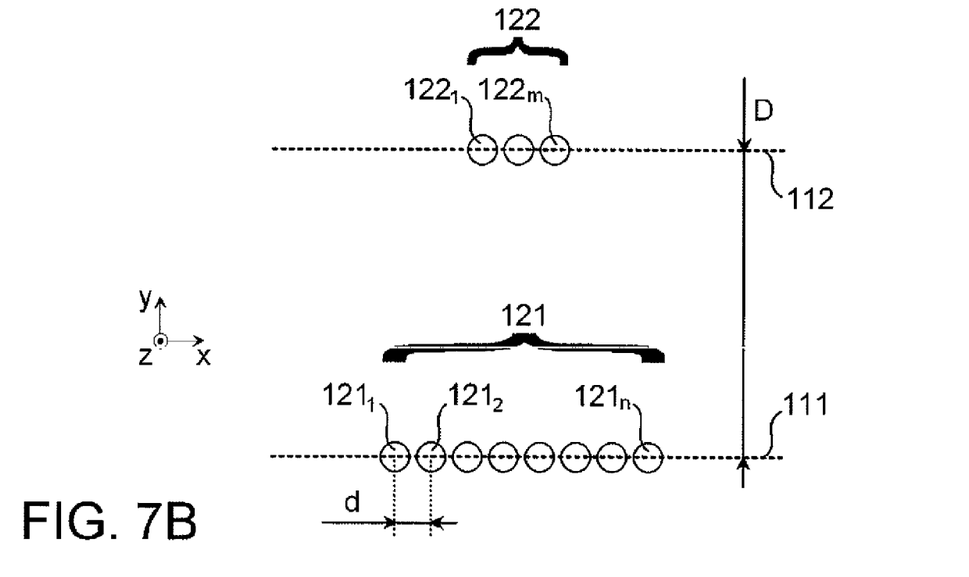

FIG. 7A and FIG. 7B represent a first embodiment of the fibre array 120 used in the optical device 100 according to the invention. The fibre array 120 is a mounting assembly comprising M input elements 122 and N output elements 121. The beam emitting end faces $122_1, \ldots, 122_m$ of the input elements 122 are positioned on a first straight line said emission line 112, whereas the beam receiving end faces $121_1, \ldots, 121_n$ of the output elements 121 are positioned on a second straight line 111 said reception line. The two straight lines 111 and 112 are parallel and are separated by a distance D that is chosen such that at least the input elements 122 do not affect the output elements 121 and vice versa. The end faces $122_1, \ldots, 122_m$ of the input elements 122 and the end faces $121_1, \ldots, 121_n$ of the output elements 121 are positioned such that they substantially coincide with the end face 125 of the fibre array 120.

Figure 8:
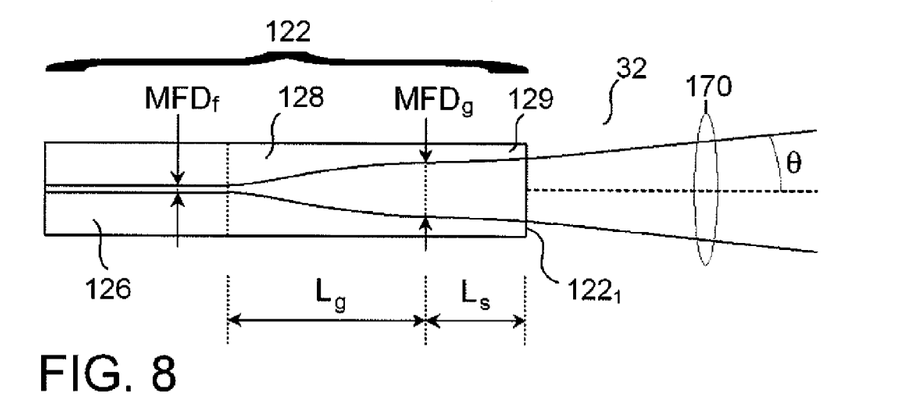
FIG. 8 shows propagation in a single mode optical fibre, comprising a lensed end, up to its end face followed by beam propagation in the adjacent homogeneous medium.

In the embodiment depicted in FIGS. 7A and 7B, the fibre array 120 comprises a double sided V-groove block 123, an output lid $124_1$ and an input lid $124_2$, M input elements 122 and N output elements 121 in which both input and output elements are optical fibres. These fibres are either single mode as shown in FIG. 5, single mode terminated with a graded-index lens as shown in FIG. 8 or even multimode. The M input fibres 122 are mounted in the V-shaped grooves and covered by the input lid $124_2$ on one side of the block 123 whereas the N output fibres 121 are mounted in the V-shaped grooves and covered by the output lid $124_1$ on the other side of the block 123. It is noted that the use of a double sided V-groove block ensures parallelism between input fibres 122 and output fibres 121 by construction opposed to stacking of V-groove blocks (fibre array 20b in FIG. 3A and FIG. 3B).

The end face 125 of the fibre array 120 is polished such that the end faces $122_1, \ldots, 122_m$ of the input fibres 122 and the end faces $121_1, \ldots, 121_n$ of the output fibres 121 become part of the end face 125 of the fibre array 120. In case there is a refractive index difference between the fibres 121, 122 and the adjacent medium 32, generally, an anti-reflection coating is applied on the end face 125 to eliminate the Fresnel reflection.

In case of demultiplexing of channels that are equidistantly spaced with respect to wavelength, the end faces $121_1, \ldots, 121_n$ of the output elements 121 are equidistantly spaced at a distance d as shown in FIG. 7B. The distance d is typically comprised in the range from 40 μm to 250 μm which is related to the outer diameter of most common output elements 121.

The compact dispersing system 130 ensures wavelength selective conjugation between the end faces $122_1, \ldots, 122_m$ of the input elements 122 and the end faces $121_1, \ldots, 121_n$ of the output elements 121. It comprises a plane mirror 140, a concave mirror 60 having a focus and a focal plane, and a plane diffraction grating 50 having a dispersion plane. The end face 125 of the fibre array 120, the end faces $122_1, \ldots, 122_m$ of the input elements 122 and the end faces $121_1, \ldots, 121_n$ of the output elements 121 are located in the vicinity of the focal plane of the mirror 60 such that the diverging beams coming from the end faces of the input elements 122 become collimated by reflection on the mirror 60 while being directed towards the plane mirror 140. The concave mirror 60 has an axis 63 which intersects the end face 125 of the fibre array 120 half way between the two parallel straight lines 111 and 112 of the end faces $121_1, \ldots, 121_n, 122_1, \ldots, 122_m$ while being perpendicular to the end face 125 of the fibre array 120. The diffraction grating 50 makes an angle of about 90°−φ with respect to the end face 125 of the fibre array 120 while its dispersion plane is parallel with respect to the two parallel straight lines 111 and 112 of the end faces $121_1, \ldots, 121_n, 122_1, \ldots, 122_m$. The angle φ is chosen such that the position of the grating 50 does not affect beam propagation in the compact dispersing system 130, for example φ=0° (FIG. 6A). The plane mirror 140 reflects the collimated beams coming from the concave mirror 60 to the grating 50 and, inversely, reflects the diffracted collimated beams coming from the grating 50 to the concave mirror 60. The plane mirror 140 located between the end face 125 of the fibre array 120 and the concave mirror 60 is perpendicular to the dispersion plane, it makes an angle α with respect to the axis 63 of the concave mirror 60 such that the diffraction grating 50 is located in the vicinity of the focus of the concave mirror 60, and the angle α is chosen such that the diffraction grating 50 is operated near Littrow. The concave mirror 60 reflects the dispersed collimated beams coming from the plane mirror 140 such that the beams are focused on the reception line 111 of the fibre array 120, about linearly distributed over the line with respect to wavelength, and entering end faces of the output elements 121 where they are present. The size of the plane mirror 140 is limited with respect to the two parallel straight lines 111 and 112 of the end faces such that beams propagating from the end faces $122_1, \ldots, 122_m$ of the input elements 122 to the concave mirror 60 and beams propagating from the concave mirror 60 to the end faces $121_1, \ldots, 121_n$ of the output elements 121 are not affected by the presence of the plane mirror 140.

The optical axis of the compact dispersing system 130 is folded which ensures compactness of the optical device 100. The optical axis is divided into six segments referenced 131a, 131b, 131c, 131d, 131e and 131f.

The first segment 131a of the optical axis runs from the straight line 112 coinciding with the end faces $122_1, \ldots, 122_m$ of the input elements 122 up to the concave mirror 60 while passing the plane mirror 140, it is perpendicular to the end face 125 of the fibre array 120, it makes an angle α with respect to the plane mirror 140 (FIG. 6A) and its end point at the concave mirror 60 is located vertically at a distance ½ D from the axis 63 of the mirror 60 (FIG. 6B).

The second segment 131b of the optical axis starts at the concave mirror 60 from the end point of the first segment 131a of the optical axis and runs up to the plane mirror 140. The first segment 131a and the second segment 131b of the optical axis make an angle γ in the yz-plane of approximately:

$$\gamma \approx \arctan(D/(2f)) \quad (3)$$

where f is the focal length of the concave mirror 60.

The third segment 131c of the optical axis starts at the plane mirror 140 from the end point of the second segment 131b of the optical axis and runs to the diffraction grating 50 where it intersects the normal of the grating 50, referenced 33. The projection in the xz-plane of the third segment 131c makes an angle β with the normal 33, where is β the Littrow angle of the grating 50, such that the angles α and β are related as follows: α=(β+90°)/2 when φ=0° (FIG. 6A).

The three remaining segments 131d, 131e, 131e are related to the first three 131a, 131b, 131c by mirror symmetry with respect to the xz-plane that comprises the axis 63 of the mirror 60. The fourth segment 131d of the optical axis is symmetrical with the third segment 131c; the angle between the two is about 2γ. The fifth segment 131e of the optical axis is symmetrical with second segment 131b. The sixth segment 131f of the optical axis runs up to the end faces $121_1, \ldots, 121_n$ of the output elements 121 and is symmetrical with the first segment 131a; both segments are separated by a distance D.

FIG. 6A and FIG. 6B show an embodiment of the compact dispersing system 130 using three parts: a wedge prism 142, a plano-concave lens 61, and a substrate 51. The wedge prism 142 is used to ensure the positioning of the plane mirror 140 with respect to the end face 125 of the fibre array 120 and to the optical axis 131a, 131b, 131c, 131d, 131e, 131f. The wedge prism 142 comprises a tilted face 143 serving as support for the plane mirror 140 whereas the opposite face 144 is parallel with the end face 125 of the fibre array 120. In the embodiment of FIG. 6A and FIG. 6B, the parallelism is ensured by mounting the wedge prism 140 onto the end face 125 of the fibre array 120 such that the said opposite face 144 and the end face 125 of the fibre array coincide. The plano-concave lens 61 serves as support for the mirror 60 that resides on its concave face 62. It is noted that the concave mirror 60 can have different concave shapes: the most common shapes are spherical and parabolic. The substrate 51 serves as support for the plane diffraction grating 50 which is formed on the surface of the substrate. The space 32 is filled with air, vacuum or a gas.

Beam propagation in the compact dispersing system 130 requires that the divergence angle θ of the input beam is compatible with the presence of the plane mirror 140 and a limited reflection area on the concave mirror 60. It is noted that the limitation of this reflection area is due to the height restriction of optical devices used in telecommunications equipments, in particular for multiplexers and demultiplexers.

The beam divergence coming from a single mode optical fibre has been explained in the description of the optical device 10 of the prior art (see FIG. 5). As previously stated, for the commonly used SMF-28 fibre from Corning, a wavelength $\lambda=\lambda_0/n$ with $\lambda_0$ of 1550 nm, and an adjacent medium 32 with a refractive index n of 1, the divergence angle θ is 5.4°. For beam propagation in the compact dispersing system 130, a smaller divergence angle is preferable and, in most cases, even mandatory. Special single mode optical fibres exist with an MFD of up to about 25 µm, which implies a divergence angle θ down to about 2.3° compared to the SMF-28 fibre. The use of special single mode fibres is a solution for some applications, but, for most applications, the use of SMF-28 or equivalent input and output fibres is required.

Termination of an optical fibre with collimating means can significantly reduce the divergence angle θ of the outgoing beam. This implies that SMF-28 or equivalent input and output fibres can be used in an optical device 100 according to the present invention while adjusting the divergence angle θ with the collimating means to the requirements of the dispersing system 130. Therefore, it is preferable and, in many cases, even mandatory to incorporate collimating means into the input elements 122 and the output elements 121. Hereafter, different embodiments of the input elements 122 and the output elements 121 comprising collimating means are described.

FIG. 8 represents a first embodiment of a single mode optical fibre terminated with collimating means. In this embodiment, the input element 122 comprises an input fibre 126, a graded-index lens 128 and a coreless stub 129; the end face of the coreless stub 129 being the end face $122_j$ of the input element 122. The graded-index lens 128 of length $L_g$ is spliced to the single mode fibre 126 and the coreless stub 129 of length $L_s$ is spliced to the graded-index lens 128. It is noted that the coreless stub 129 is added to enable polishing of the end face 125 of the fibre array 120 without modifying the length $L_g$ of the graded-index lens 128.

FIG. 8 shows propagation in a single mode optical fibre terminated with collimating means 122 up to the end face $122_1$ of the coreless stub 129 followed by beam propagation in the adjacent homogeneous medium 32. Propagation in the graded-index lens 128 spliced to the single mode optical fibre 126, increases the mode field diameter of the fibre, $MFD_f$, up to a mode field diameter, $MFD_g$. The length $L_g$ is preferably a ¼ pitch of the graded-index profile, which makes $MFD_g$ coincide with the interface between the graded-index lens 128 and the coreless stub 129. From this interface, the beam diverges over the length $L_s$ in the coreless stub 129, which is to be considered as a homogeneous medium, and subsequently the input beam 170 continues to diverge after the end face $122_1$ in the adjacent homogeneous medium 32. The increase of the MFD from $MFD_f$ to $MFD_g$ implies a reduction of the angle θ of the beam coming out of the end face $122_1$ of the input element 122 (see relation (2)).

For an SMF-28 input fibre 126 terminated with a graded-index lens 128 having a graded-index profile that increases the MFD to $MFD_g$ of 75 µm, a wavelength $\lambda=\lambda_0/n$ with $\lambda_0$ (wavelength in vacuum) of 1550 nm, and an adjacent medium 32 with a refractive index n of 1, the angle θ of the beam is 0.75°. In the dispersing system 130, this cone intersects with the spherical mirror 60 at a propagation distance about equal to the focal length f of the mirror 60. For a focal length f of 65 mm, the reflection area of the beam 170 on the mirror 60 has then a diameter of about 1.7 mm (see relation (3)).

Figure 9:
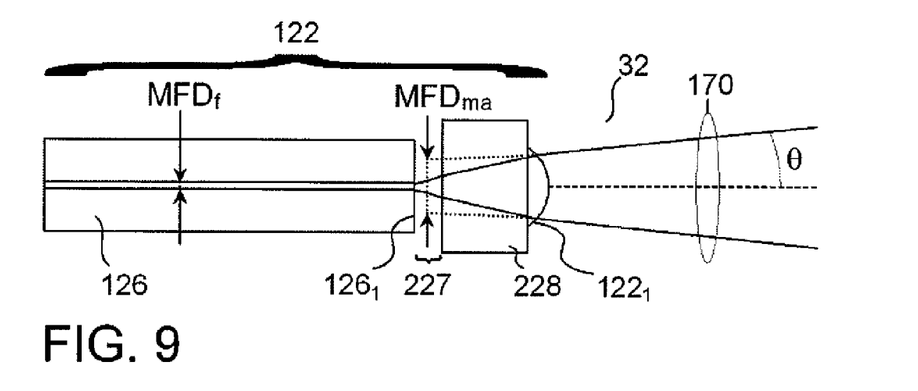
FIG. 9 shows propagation in a single mode optical fibre up to its end face followed by beam propagation in the adjacent homogeneous medium, a microlens, and another homogeneous medium.

FIG. 9 represents a second embodiment of a single mode optical fibre terminated with collimating means. In this embodiment, the input element 122 comprises an input fibre 126 having an end face $126_1$, a small gap 227 filled with a homogeneous medium, and a microlens 228; the end face of the microlens 228 being the end face $122_1$ of the input element 122. The microlens 228 is precisely aligned and mounted with respect to the end face $126_1$ of the input fibre 126. In case that the microlens is attached to the end face $126_1$ of the input fibre 126 with an epoxy, the gap 227 is filled with the epoxy which is a homogeneous medium having a refractive index that is close to the refractive index of the materials used in the optical fibre 126 and the microlens 228. Generally, an anti-reflection coating is applied on the end face of the microlens 228 to eliminate the Fresnel reflection.

FIG. 9 shows propagation in a single mode optical fibre terminated with collimating means 122 up to the end face $122_1$ of the microlens 228 followed by beam propagation in the adjacent homogeneous medium 32. Propagation from the end face $126_1$ of the input fibre 126 up to the end face $122_1$ of the microlens 228 corresponds to a diverging beam in a cascade of 2 homogeneous media, subsequently, propagation through the curved surface (end face) $122_1$ of the microlens 228 reduces the divergence angle of the beam, the resulting beam 170 continues to diverge after the end face $122_1$ in the adjacent homogeneous medium 32 and has a divergence angle θ. The resulting beam 170 has a virtual beam waist $MFD_{ma}$ that is located in the vicinity of the end face $126_1$ of the input fibre 126. So, the use of a microlens 228 as collimating means increases the MFD from $MFD_f$ to $MFD_{ma}$.

Figure 10:
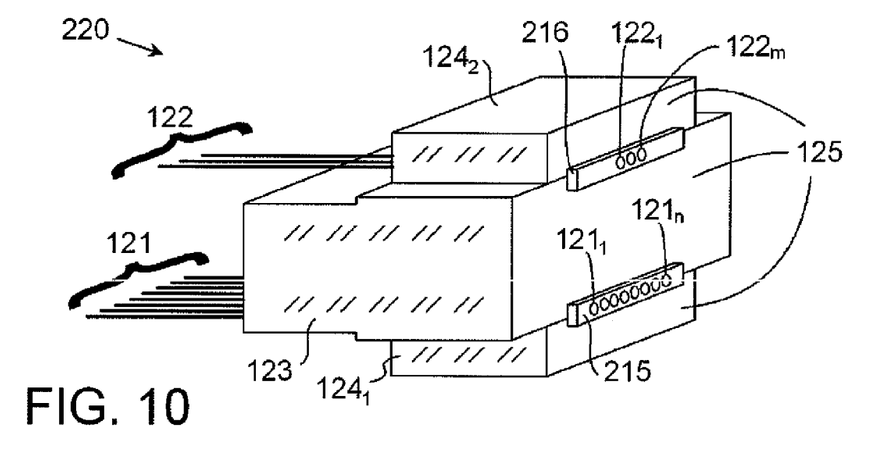
FIG. 10 represents a second embodiment of the fibre array used in an optical device according to the invention where the fibre array comprises microlenses.

FIG. 10 represents a second embodiment of a fibre array 220 used in the optical device 100 according to the invention where the fibre array 220 comprises microlenses. The embodiment of the fibre array 220 is composed of a fibre array 120 having single mode input and output fibres (see FIG. 7A, FIG. 7B and the corresponding description) and two microlens arrays 215, 216 which are precisely aligned and mounted with respect to the said emission line 112 and the said reception line 111 of the fibre array 120. This way, each single mode optical fibre is terminated by a microlens (see FIG. 9). Various microlens arrays are available on the market, for example, buried graded-index microlens arrays marketed by NSG (Nippon Sheet Glass) or plano-convex refractive microlens arrays marketed by SUSS MicroOptics.

It is noted that microlenses are also well suited as collimating means for multimode optical fibres. Therefore, an optical device 100 according to the present invention can comprise multimode fibres instead of single mode fibres.

Figure 11A:
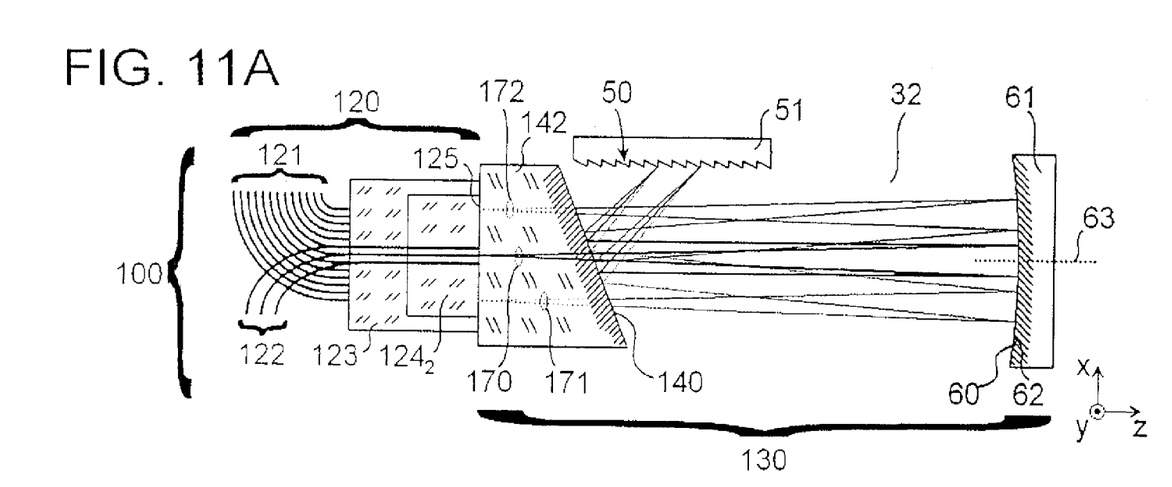
FIG. 11A and FIG. 11B represent the optical device according to the invention, showing beam propagation in the dispersing system.
Figure 11B:
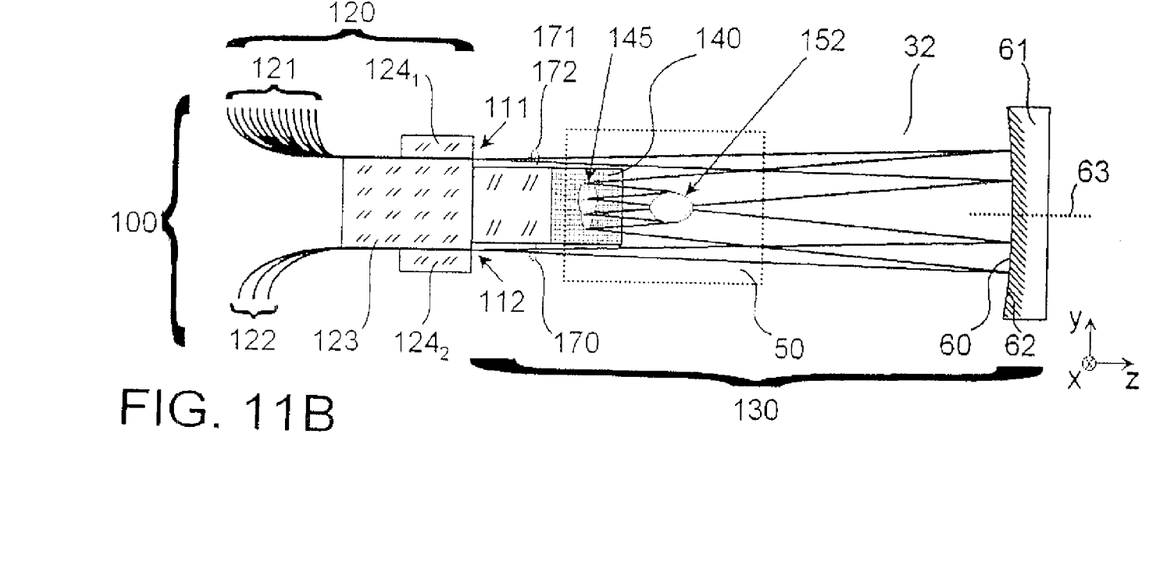

FIG. 11A and FIG. 11B represent the optical device 100 according to the present invention, showing beam propagation in the dispersing system 130, where FIG. 11A is a top view of the device 100 and FIG. 11B is a side view of the same device 100.

In case the optical device 100 operates as a demultiplexer, a signal containing a spectral multiplex of channels enters through the input element 122, propagates up to the end face $122_1$ and continues its path by beam propagation in the homogeneous medium 32, where the beam 170 propagates about parallel to the first segment of the optical axis 131a. The beam 170 diverges with an angle θ until it impinges on the concave mirror 60, on its way, it passes the plane mirror 140 without being affected by its presence.

The reflection of the beam 170 on the concave mirror 60 collimates it and directs it towards the plane mirror 140. Subsequently, it impinges on the plane minor 140 that reflects it entirely towards the grating 50. The beam 170 incident on the grating 50 near Littrow is diffracted back towards the plane mirror 140. The diffraction grating angularly separates the beam 170, containing a spectral multiplex of channels, into beams as a function of wavelength and therefore separating the channels. Only beams 171 and 172 corresponding to the first and the last channel are shown in FIG. 11A and FIG. 11B. Subsequently, they impinge on the plane mirror 140 that reflects them entirely towards the concave mirror 60. The reflection of each beam 171, 172 on the concave mirror 60 directs them about parallel to the sixth segment 131e of optical axis and focuses each beam 171, 172 onto the end faces $121_1, \ldots, 121_n$ of the corresponding output elements 121; on its way, each beam passes the plane mirror 140 without being affected by its presence. At the end faces $121_1, \ldots, 121_n$, the size of the beams is about equal to the MFD of the output elements 121 and propagation continues inside these elements (reverse direction in FIG. 5, FIG. 8 and FIG. 9). This implies that the signal present at the input element 122 is demultiplexed at the output elements 121: each output element contains one of the channels of the spectral multiplex, the signal that entered through the input element.

Operation of the optical device 100 of the invention is similar to operation of the optical device 10 of the prior art, the main difference resides in the position of the end faces $122_1, \ldots, 122_m$ of the input elements 122 and of the end faces $121_1, \ldots, 121_n$ of the output elements 121 with respect to the plane mirror. It is therefore not necessary to realise an aperture in the plane mirror which reduces the insertion loss in comparison to the prior art. Moreover, the end faces $122_1, \ldots, 122_m$ of the input elements 122 and the end face $121_1, \ldots, 121_n$ of the output elements 121 are far apart which reduces crosstalk effects. Uniformity of the insertion loss is optimized when the end face 125 of the fibre array 120 is located in the vicinity of the focal plane of the concave mirror 60 while the diffraction grating 50 is located in the vicinity of its focus.

FIG. 11B shows the reflection area 145 of all impinging beams 170, 171 and 172 on the plane mirror 140 and FIG. 11B also shows the diffraction area 152 of the impinging beam 170 on the grating 50. These areas, depending on the MFD of the input element 122 and the focal length of the dispersing system 130, give an indication of the required size of the different parts. The size of the optical device 100 of the invention as well as the optical device 10 of the prior art (FIG. 4A and FIG. 4B) increase when the spectral spacing between the channels decreases, because this requires an increase of the focal length of the dispersion system 130 of the invention as well as of the dispersion system 30 of the prior art. The difference is that the height of the optical device 100 of the invention can be kept limited by terminating the input elements 122 and the output elements 121 with appropriate collimating means.

A single mode demultiplexer comprising an optical device 100 according to the present invention has been implemented. The optical device 100 has a diffraction grating 50 with a groove density of 900 gr/mm that is optimized for use in the first order of diffraction over the spectral range from 1525 nm to 1575 nm, a concave spherical mirror 60 with a radius of 130 mm and a fibre array 120 with one single mode input fibre and 24 single mode output fibres, all terminated by a graded-index lens spliced to the fibre end which adapts the MFD to about 78 µm (FIG. 8). In the fibre array 120, the end faces $121_1, \ldots, 121_n$ of the terminated output fibres are equidistantly spaced at a distance d of 130 µm and the distance D between the emission line 112 and the reception line 111 is 6.5 mm (FIG. 7B). The resulting demultiplexer has 24 output channels that are equidistantly spaced at 1.6 nm. The filter function of each output channel has a Gaussian like shape with a full width half maximum of about 0.8 nm.

As described above, the optical devices according to the present invention are adapted to the required optical functions by interchanging fibre arrays. The first two embodiments of fibre arrays 120, 220 comprise optical fibres but no optoelectronic components (laser diodes, photodiodes). The emission line 112 and the reception line 111 of the fibre arrays are well separated which makes it possible to combine optoelectronic components on one line with optical fibres on the other line while directly using the standard mounts of the optoelectronic components. It is noted that optoelectronic components can be terminated with collimating means, for example, microlenses.

Figure 12:
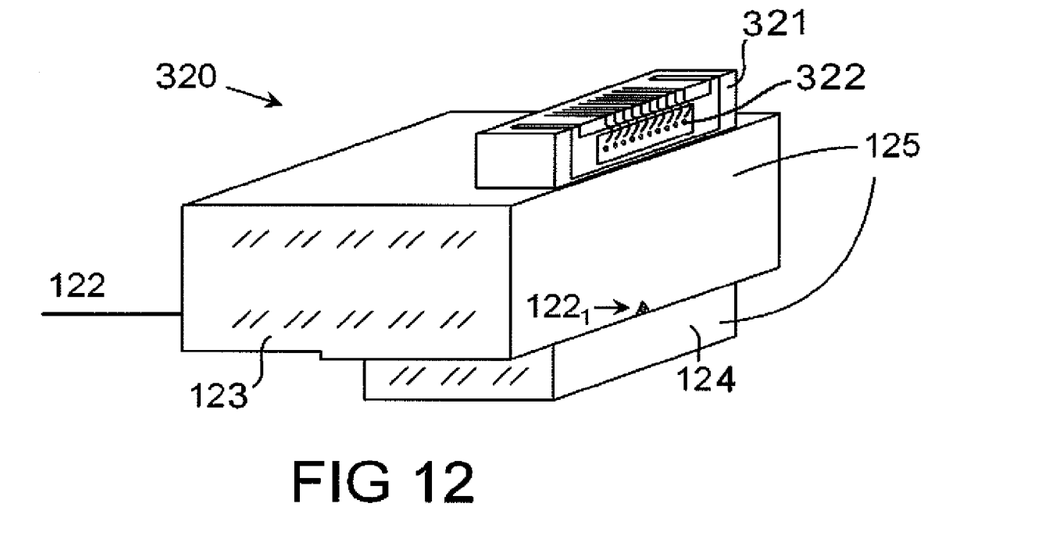
FIG. 12 represents a third embodiment of the fibre array used in an optical device according to the invention where the fibre array comprises photodiodes.

FIG. 12 represents a third embodiment of a fibre array 320 used in an optical device according to the invention that is comprised in an optical channel monitor. The fibre array 320 comprises an end face 125, a double sided V-groove block 123, an input lid $124_2$, a single input element 122 being an optical fibre and a photodiode array 321 comprising the N output elements 322 (photodiodes). The optical fibre is either single mode as shown in FIG. 5 or single mode terminated with a graded-index lens as shown in FIG. 8. The input fibre 122 is mounted in the V-shaped groove and covered by the input lid $124_2$ on one side of the block 123 whereas the photodiode array 321 is mounted on the other side of the block 123. The end face $122_1$ of the input element 122 and the end faces of the output elements 322 are positioned such that they substantially coincide with the end face 125 of the fibre array 320.

Operation of the optical device comprising fibre array 320 is understood from FIG. 11A and FIG. 11B by replacing fibre array 120 with fibre array 320. Like in a demultiplexer, a signal containing a spectral multiplex of channels enters through the input fibre 122, propagates up to its end face $122_1$ and continues its path by beam propagation in the dispersing system which separates the beam 170 into beams 171, 172 implying separation of the channels at the output elements 322 of the fibre array 320 as previously described. Instead of coupling into output fibres like with fibre arrays 120, 220, the beams 171, 172 couple into the photodiodes 322. Then, each photodiode detects electrically the power level of its corresponding channel.

A single mode optical channel monitor comprising an optical device according to the present invention has been implemented with a photodiode array 321 referenced by Hamamatsu under the number G8909-01. This photodiode array comprises 40 PIN photodiodes on a ceramic mount where the photodiodes are equally spaced on a straight line with a pitch d of 250 µm. The optical device has a diffraction grating 50 with a groove density of 600 gr/mm that is optimized for use in the second order of diffraction over the spectral range from 1525 nm to 1575 nm, a concave spherical mirror 60 with a radius of 190 mm and a fibre array 320 with the Hamamatsu photodiode array 321 as well as a single mode input fibre 122 terminated by a graded-index lens spliced to the fibre end adapting the MFD to about 67 µm (FIG. 8). The end face $122_1$ of the input fibre 122 is separated from the straight line of photodiodes 322 by a distance D of 6.5 mm in the y-direction while in the x-direction it is positioned with respect to the centre of the photodiode array 321. The resulting channel monitor observes the power levels of 40 channels that are equally spaced at 0.8 nm.

A multimode mode optical channel monitor comprising an optical device according to the present invention can also be implemented by using a multimode input fibre terminated with collimating means instead of the single mode input fibre.

Similarly to fibre array 320, a fibre array can be made that comprises one or more laser diodes as input elements in combination with an optical fibre as output element. It is noted that laser diodes require termination with collimating means due to the fact that their emitted beam is, in general, elliptic and strongly diverging.

Up to this point, static optical devices according to the present invention have been described (devices without moving parts). Dynamic optical devices according to the present invention provide wavelength tuning (devices with moving parts). Such dynamic devices are more and more required in fibre optic long-haul and metro networks as well as in test and measurement equipment.

Figure 13:
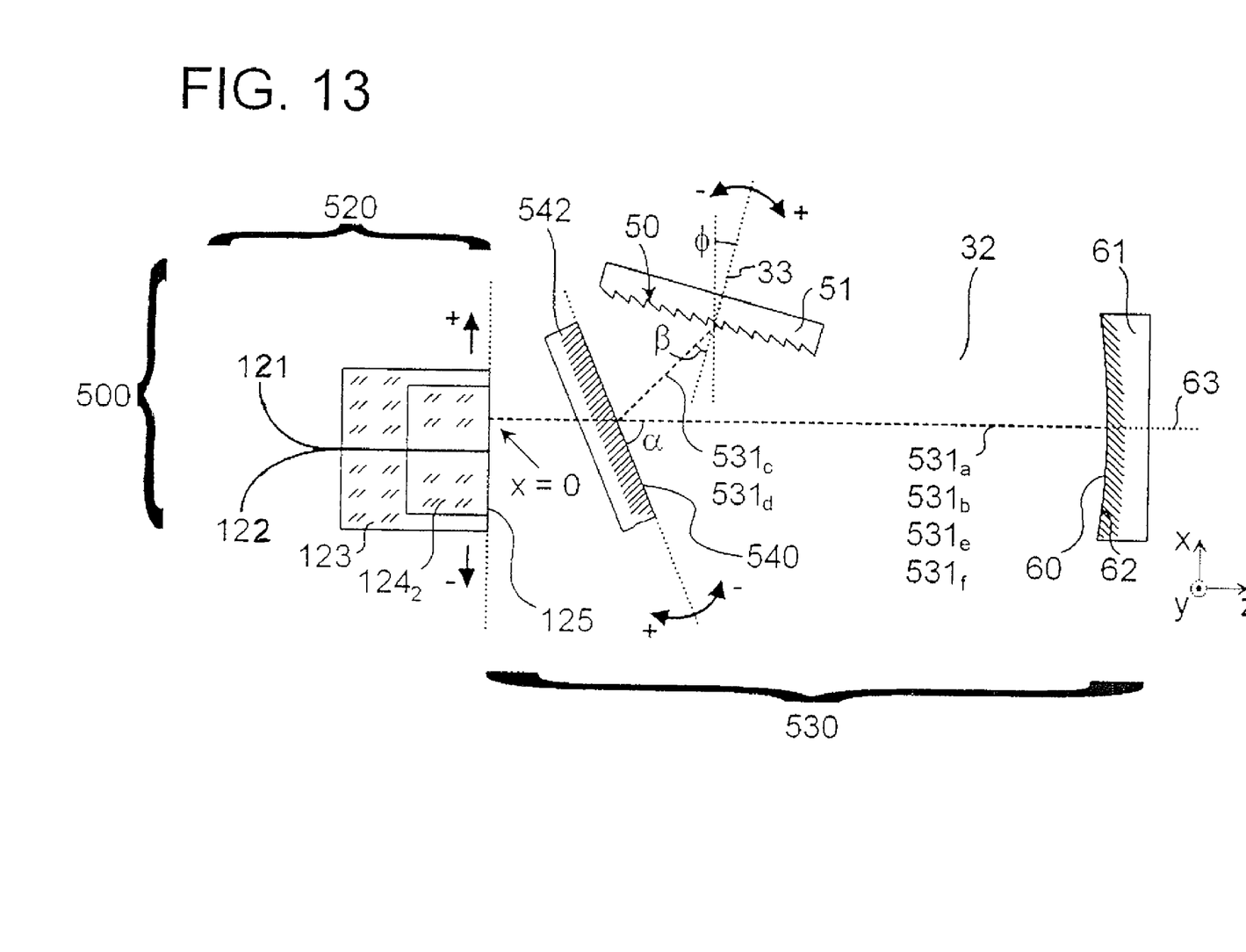
FIG. 13 represents an optical device according to the invention, showing three wavelength timing mechanisms.

FIG. 13 represents the top view of an optical device 500 according to the present invention comprising wavelength tuning. The depicted embodiment of the device 500 is for example comprised in a wavelength tunable filter. FIG. 13 shows three different tuning mechanisms:

1) The plane mirror 540 has a rotation mechanism for tuning the angle α;
2) The diffraction grating 50 has a rotation mechanism for tuning the angle φ;
3) The fibre array 520 has a translation mechanism for simultaneously tuning the position x of the end faces of the input elements 122 and the output elements 121 over the said parallel straight lines 111 and 112.

It is noted that an optical device 500 requires only one of these three mechanisms in order to be tunable with respect to wavelength.

The references 531a, 531b, 531c, 531d, 531e and 531f represent the different segments of the optical axis of the optical device 500. Each segment 531a, 531b, 531c, 531d, 531e, 531f corresponds to the segment respectively referenced 131a, 131b, 131c, 131d, 131e, 131f and described previously with FIG. 6A and FIG. 6B.

The two angular tuning mechanisms are understood from the fact that the angles α, β and φ are related as follows: α=(β+φ+90°)/2 in which β is the Littrow angle at a given wavelength λ. The angle β becomes a function of wavelength, i.e. β(λ), when at least one of the angles α and φ can be tuned.

The angular tuning mechanism is, for example, provided by a mechanical rotation stage: tuning of the angle φ is then obtained by mounting the substrate 51 of the diffraction grating 50 on a rotation stage precisely ensuring the required movement whereas, equivalently, tuning of the angle α is obtained by mounting the substrate 542 of the plane mirror 540 on a rotation stage. The angular tuning mechanism for α can also be provided by a MEMS mirror which is a micro mechanical system comprising the plane mirror 540 that is rotated by an electrostatic mechanism.

The position tuning mechanism is understood from the fact that position x of the end faces of the input elements 122 on the emission line 112 and the output elements 121 on the reception line 111 are approximately related as follows: Δλ/Δx. A translation of Δx of the end face of an input element 122 on the emission line 112 corresponds to a change in wavelength of about Δλ, whereas a translation of Δx of the end face of an output element 121 on the reception line 111 corresponds to a change in wavelength of about Δλ. This implies that a simultaneous translation of Δx of the end faces of the input elements 122 and the output elements 121 over the said parallel straight lines 111 and 112 corresponds to a change in wavelength of about 2Δλ.

Simultaneous position tuning of the end faces of the input elements 122 and the output elements 121 of the fibre array 520 over the said parallel straight lines 111 and 112 is obtained by mounting the fibre array 520 on a translation stage precisely ensuring the required movement. Inversely, the dispersion system 530 can be mounted on a translation stage for precisely ensuring the equivalent movement, but this is in general less practical because of the size of the dispersion system 530.

It is noted that a translation with respect to the x-direction of the concave mirror 60 also provides wavelength tuning; the translation of the concave mirror 60 being similar to the translation of the fibre array 520 described above. To this end, the concave mirror 60 has a translation mechanism for tuning the position of the concave mirror 60 parallel along the said parallel straight lines.

A single mode wavelength tunable filter comprising an optical device 500 according to the present invention has been implemented. The optical device 500 has a diffraction grating 50 with a groove density of 600 gr/mm that is optimized for use in the second order of diffraction over the spectral range from 1525 nm to 1575 nm, a concave spherical mirror 60 with a radius of 200 mm and a fibre array 520 with one single mode input fibre 122 and one single mode output fibre 121 both terminated by a graded-index lens spliced to the fibre end adapting the MFD to about 67 µm (FIG. 8). The end face of the input fibre 122 has the same position as the end face of the output fibre 122 in the x-direction while being separated by a distance D of 6.5 mm in the y-direction. The filter is tuned over 50 nm from 1525 nm to 1575 nm. It has a Gaussian like shape with a fill width half maximum of about 0.17 nm over the tuning range.

Table 1 shows λ, β, α, φ and x for wavelength tuning of the optical device 500 by tuning the angle φ where x=0 mm and a has been chosen such that φ=0° at the center wavelength of the tuning range. In this example, the entire wavelength range of the tunable filter is covered by an angular tuning range of Δφ=4.70°.

TABLE 1

Wavelength tuning by tuning the angle φ

| λ | β | α | φ | x |
|---|---|---|---|---|
| 1525 nm | 66.21° | 79.22° | 2.22° | 0.00 mm |
| 1550 nm | 68.43° | 79.22° | 0.00° | 0.00 mm |
| 1575 nm | 70.91° | 79.22° | −2.48° | 0.00 mm |

Angular tuning range: Δφ = 4.70°

Table 2 shows λ, β, α, φ and x for wavelength tuning of the optical device 500 by tuning the angle α for φ=0° and x=0 mm. In this example, the entire wavelength range of the tunable filter is covered by an angular tuning range of Δα=2.35°.

TABLE 2

Wavelength tuning by tuning the angle α

| λ | β | α | φ | x |
|---|---|---|---|---|
| 1525 nm | 66.21° | 78.11° | 0.00° | 0.00 mm |
| 1550 nm | 68.43° | 79.22° | 0.00° | 0.00 mm |
| 1575 nm | 70.91° | 80.46° | 0.00° | 0.00 mm |

Angular tuning range: Δα = 2.35°

Table 3 shows λ, β, α, φ and x for wavelength tuning of the optical device 500 by tuning the position x for φ=0° in combination with α chosen such that x=0 mm at the center wavelength of the tuning range. In this example, the entire wavelength range of the tunable filter is covered by a position tuning range of Δx=8.16 mm.

TABLE 3

Wavelength tuning by tuning the position x

| λ | β | α | φ | x |
|---|---|---|---|---|
| 1525 nm | 68.43° | 79.22° | 0.00° | −4.08 mm |
| 1550 nm | 68.43° | 79.22° | 0.00° | 0.00 mm |
| 1575 nm | 68.43° | 79.22° | 0.00° | 4.08 mm |

Position tuning range: Δx = 8.16 mm

Equivalently, a multimode wavelength filter can be implemented by replacing the input single mode fibre 122 and the output single mode fibre 121 of the optical device 500 by multimode fibres that are terminated with collimating means, for example microlenses (FIG. 9). In fact, all previously described devices, routers, multiplexers, demultiplexers as well as optical channel monitors, can be made wavelength tunable with one of the previously described tuning mechanisms. It is further noted that the optical device of the present invention can also be used in tunable external cavity lasers and in optical spectrum analyzers.

Although the present invention has been described in terms of illustrative embodiments, it is anticipated that alterations and modifications thereof will no doubt become apparent to those of ordinary skill in the art. It is therefore intended that the following claims are interpreted as covering all such alterations and modifications as falling within the true spirit and scope of the invention.

The invention claimed is:

1. An optical device (100, 500) comprising:
a) a single fibre array (120, 220, 320, 520) comprising a single end face (125);
   i) the single fibre array (120, 220, 320, 520) being a mounting assembly that comprises M input elements (122) with beam emitting end faces positioned on a first straight emission line (112), and N output elements (121) with beam receiving end faces positioned on a second straight reception line (111) which is parallel to the first straight emission line (112) and separated from the first straight emission line (112) by a distance D chosen such that at least the input elements (122) do not affect the output elements (121) and vice versa, where the beam emitting end faces of the input elements (122) and the beam receiving end faces of the output elements (121) are positioned such that they substantially coincide with the single end face (125) of the fibre array (120, 220, 320, 520); and
b) a compact dispersing system (130, 530);
c) the compact dispersing system (130, 530) ensuring wavelength selective conjugation of signals between the end faces of the input elements (122) and the end faces of the output elements (121) based on beam propagation and comprising:
   i) an aperture-less plane mirror (140, 540);
   ii) a single concave mirror (60) having a focus, a focal plane and an axis (63) that intersects the end face (125) of the fibre array (120, 220, 320, 520) half way between the two said parallel straight lines (111, 112) while being perpendicular to the end face (125) of the fibre array (120, 220, 320, 520); and
   iii) a plane diffraction grating (50) having a dispersion plane that is parallel with respect to the two said parallel straight lines (111, 112) while the diffraction grating (50) makes an angle of 'π° -φ with respect to the end face (125) of the fibre array (120, 220, 320, 520) where the angle φ is chosen such that the position of the grating (50) does not affect beam propagation in the compact dispersing system (130, 530);
d) the end face (125) of the fibre array (120, 220, 320, 520) being located in the vicinity of the focal plane of the concave mirror (60) such that the diverging beams coming from the end faces of the input elements (122) become collimated by reflection on the mirror (60) while being directed towards the plane mirror (140, 540);
e) the plane mirror (140, 540) reflecting the collimated beams coming from the concave mirror (60) to the grating (50) and, inversely, reflecting the diffracted collimated beams coming from the grating (50) to the concave mirror (60), being firstly located between the end face (125) of the fibre array (120, 220, 320, 520) and the concave mirror (60), being secondly perpendicular to the dispersion plane, and making thirdly an angle 'α' with respect to the axis (63) of the concave mirror (60) such that the diffraction grating (50) is located in the vicinity of the focus of the concave mirror (60), the angle α being chosen such that the diffraction grating (50) is operated near Littrow;
f) the concave mirror (60) reflecting the dispersed collimated beams coming from the plane mirror (140, 540) and said dispersed collimated beams passing by the plane mirror (140, 540) without being affected by said plane mirror such that the beams are focused on the reception line (111) of the fibre array (120, 220, 320, 520), about linearly distributed over the line with respect to wavelength, and entering end faces of the output elements (121) where they are present; and
g) the optical device (100, 500) being characterised in that the size of the plane mirror (140, 540) is limited with respect to the two said parallel straight lines (111, 112) such that beams propagating from the end faces of the input elements (122) to the concave mirror (60) and beams propagating from the concave mirror (60) to the end faces of the output elements (121) are not affected by the presence of the plane mirror (140, 540).

2. The optical device (100,500) of claim 1, wherein the plane mirror (140, 540) has a rotation mechanism for tuning the angle α which enables wavelength tuning of the device.

3. The optical device (100, 500) of claim 1, wherein the diffraction grating (50) has a rotation mechanism for tuning the angle φ which enables wavelength tuning of the device.

4. The optical device (100, 500) of claim 1, wherein the fibre array (120, 220, 320, 520) has a translation mechanism for simultaneously tuning the position of the end faces of the input elements (122) and the output elements (121) over the said parallel straight lines (111, 112) which enables wavelength tuning of the device.

5. The optical device (100, 500) of claim 1, wherein the concave mirror (60) has a translation mechanism for tuning the position of the concave mirror (60) parallel along the said parallel straight lines (111, 112), which enables wavelength tuning of the device.

6. The optical device (100, 500) of claim 1, wherein each input element (122) is a single mode fibre.

7. The optical device (100, 500) of claim 6, wherein each single mode fibre (122) is terminated with collimating means.

8. The optical device (100, 500) of claim 7, wherein each collimating means consists of a graded-index lens (128) spliced to the end of said single mode fibre (121, 122).

9. The optical device (100, 500) of claim 1, wherein each output element (121) is a single mode fibre.

10. The optical device (100, 500) of claim 9, wherein each single mode fibre (121) is terminated with collimating means.

11. The optical device (100, 500) of claim 10, wherein each collimating means consists of a graded-index lens (128) spliced to the end of said single mode fibre (121, 122).

12. The optical device (100, 500) of claim 1, wherein each input element (122) is a multimode fibre terminated with collimating means.

13. The optical device (100, 500) of claim 1, wherein each output element (121) is a multimode fibre terminated with collimating means.

14. The optical device (100, 500) of claim 1, wherein each output element (121) is a photodiode.

15. The optical device (100, 500) of claim 14, wherein each photodiode (121) is terminated with collimating means.

16. The optical device (100, 500) of claim 1, wherein each input element (122) is a laser diode terminated with collimating means.

17. The optical device (100, 500) of claim 1, wherein each input element (122) and output element (121) is terminated with collimating means consisting of a microlens (228).

18. A single mode wavelength router comprising the optical device (100, 500) of claim 1, wherein each input element (122) is a single mode fibre, and wherein each output element (121) is a single mode fibre.

19. A single mode wavelength router comprising the optical device (100, 500) of claim 1, wherein each input element (122) is a single mode fibre terminated with collimating means, and wherein each output element (121) is a single mode fibre terminated with collimating means.

20. A single mode wavelength multiplexer comprising the optical device (100, 500) of claim 1, wherein each input element (122) is a single mode fibre, and wherein there is only one output element (121) that is a single mode fibre.

21. A single mode wavelength multiplexer comprising the optical device (100, 500) of claim 1, wherein each input element (122) is a single mode fibre terminated with collimating means, and wherein there is only one output element (121) that is a single mode fibre terminated with collimating means.

22. A single mode wavelength demultiplexer comprising the optical device (100, 500) of claim 1, wherein there is only one input element (122) that is a single mode fibre, and wherein each output element (121) is a single mode fibre.

23. A single mode wavelength demultiplexer comprising the optical device (100, 500) of claim 1, wherein there is only one input element (122) that is a single mode fibre terminated with collimating means, and wherein each output element (121) is a single mode fibre terminated with collimating means.

24. A single mode wavelength filter comprising the optical device (100, 500) of claim 1, wherein there is only one input element (122) that is a single mode fibre, and wherein there is only one output element (121) that is a single mode fibre.

25. A single mode wavelength filter comprising the optical device (100, 500) of claim 1, wherein there is only one input element (122) that is a single mode fibre terminated with collimating means, and wherein there is only one output element (121) that is a single mode fibre terminated with collimating means.

26. A single mode optical channel monitor comprising the optical device (100, 500) of claim 1, wherein each output element (121) is a photodiode, and wherein there is only one input element (122) that is a single mode fibre.

27. A single mode optical channel monitor comprising the optical device (100, 500) of claim 1, wherein each output element (121) is a photodiode terminated with collimating means, and wherein there is only one input element (122) that is a single mode fibre.

28. A multimode wavelength router comprising the optical device (100, 500) of claim 1, wherein each input element (122) is a multimode fibre terminated with collimating means and wherein each output element (121) is a multimode fibre terminated with collimating means.

29. A multimode wavelength multiplexer comprising the optical device (100, 500) of claim 1, wherein each input element (122) is a multimode fibre terminated with collimating means and wherein there is only one output element (121) that is a multimode fibre terminated with collimating means.

30. A multimode wavelength demultiplexer comprising the optical device (100, 500) of claim 1, wherein there is only one input element (122) that is a multimode fibre terminated with collimating means and wherein each output element (121) is a multimode fibre terminated with collimating means.

31. A multimode wavelength filter comprising the optical device (100, 500) of claim 1, wherein there is only one input element (122) that is a multimode fibre terminated with collimating means and wherein there is only one output element (121) that is a multimode fibre terminated with collimating means.

32. A multimode optical channel monitor comprising the optical device (100, 500) of claim 1, wherein each output element (121) is a photodiode, and wherein there is only one input element (122) that is a multimode fibre terminated with collimating means.

33. A multimode optical channel monitor comprising the optical device (100, 500) of claim 1, wherein each output element (121) is a photodiode terminated with collimating means, and wherein there is only one input element (122) that is a multimode fibre terminated with collimating means.

\* \* \* \* \*